United States Patent
Cho (10) Patent No.: US 12,257,999 B1
(45) Date of Patent: Mar. 25, 2025

(54) APPARATUS AND METHOD OF ESCAPING A ROUGH ROAD FOR AN ELECTRIC VEHICLE

(71) Applicants: HYUNDAI MOTOR COMPANY, Seoul (KR); KIA CORPORATION, Seoul (KR)

(72) Inventor: Woon Ki Cho, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 18/602,852

(22) Filed: Mar. 12, 2024

(30) Foreign Application Priority Data

Oct. 30, 2023 (KR) .......... 10-2023-0146388

(51) Int. Cl.
*B60W 30/18* (2012.01)
*B60W 10/119* (2012.01)

(52) U.S. Cl.
CPC .... *B60W 10/119* (2013.01); *B60W 30/18172* (2013.01); *B60W 2520/30* (2013.01); *B60W 2530/10* (2013.01); *B60W 2540/18* (2013.01)

(58) Field of Classification Search
CPC ......... B60W 10/119; B60W 30/18172; B60W 2520/30; B60W 2530/10; B60W 2540/18
See application file for complete search history.

(56) References Cited

U.S. PATENT DOCUMENTS

| | | | |
|---|---|---|---|
| 9,150,215 B2 | 10/2015 | Berry | |
| 2006/0175113 A1* | 8/2006 | Rodeghiero | B60K 23/0808 180/249 |
| 2014/0051545 A1 | 2/2014 | Berry | |
| 2018/0141549 A1 | 5/2018 | Kelly | |

FOREIGN PATENT DOCUMENTS

| | | | | |
|---|---|---|---|---|
| CN | 105228849 A | * | 1/2016 | ......... B60K 23/0808 |
| JP | 2005289161 A | | 10/2005 | |
| JP | 2010132137 A | | 6/2010 | |
| JP | 5727668 B2 | | 4/2015 | |
| JP | 2021123257 A | * | 8/2021 | |
| KR | 101214304 B1 | | 12/2012 | |
| KR | 20150029119 A | | 3/2015 | |
| KR | 20190048254 A | * | 5/2019 | |

* cited by examiner

*Primary Examiner* — Justin Holmes
(74) *Attorney, Agent, or Firm* — Lempia Summerfield Katz LLC (57) ABSTRACT

An apparatus for escaping an uneven driving surface for an electric vehicle includes a maximum traction identification portion configured to search for a steering angle at which maximum traction is generated by applying driving torque while rotating the steering wheel. The maximum traction identification portion is also configured to identify maximum wheel torque able to be applied after rotating the steering wheel by the steering angle at which maximum traction is generated. The apparatus also includes an axle weight computation portion configured to repeatedly calculate an axle weight applied to front and rear wheels of a vehicle in which various pitching motions are implemented. The apparatus also includes a driveaway controller configured to receive information from the maximum traction identification portion and the axle weight computation portion and to control escape of the vehicle.

20 Claims, 9 Drawing Sheets

COG : CENTER OF GRAVITY
mb : VEHICLE WEIGHT
lr : CENTER OF GRAVITY ~ REAR AXLE DISTANCE
lf : CENTER OF GRAVITY ~ FRONT AXLE DISTANCE
Hcg : CENTER OF GRAVITY HEIGHT
G : ACCELERATION OF GRAVITY
bax : LONGITUDINAL VEHICLE ACCELERATION

APPARATUS AND METHOD OF ESCAPING A ROUGH ROAD FOR AN ELECTRIC VEHICLE

CROSS-REFERENCE TO RELATED APPLICATIONS

This application claims benefit of and priority to Korean Patent Application No. 10-2023-0146388, filed on Oct. 30, 2023, in the Korean Intellectual Property Office, the disclosure of which is incorporated herein by reference in its entirety.

TECHNICAL FIELD

The present disclosure relates to an apparatus and a method of escaping an uneven driving surface for an electric vehicle.

BACKGROUND

Recently, the number of people who enjoy driving off-road on surfaces such as sand, mud, and gravel has increased. Also, interest in off-road vehicles has also increased and vehicle orders have increased in many overseas countries where off-road roads are a main portion of the country.

On off-road surfaces, wheel slippage may occur frequently, and wheels may be in a stuck state in which a vehicle may not move due to resistance of the road. In this circumstance, when escaping incorrectly, wheels of the vehicle may dig into the road (sand digging, etc.) such that the wheels may be buried, and there may be no escape method other than towing.

Most off-road vehicles may be designed for four-wheel driving, and both front and rear wheels may be used for driving. When a four-wheel driving vehicle is driven off-road, both front and rear wheels may dig into the ground and are stuck in the ground, which may worsen the issue.

SUMMARY

An aspect of the present disclosure is to provide an apparatus and a method, which may assist a vehicle to become unstuck even in a state in which wheels of an electric vehicle traveling off-road are unable to move due to road resistance.

An aspect of the present disclosure is to provide an apparatus and a method that may assist a vehicle to become unstuck by providing maximum traction by implementing an escape system in a system of a vehicle without a trial and error of a driver in a state in which wheels of an electric vehicle traveling an off-road are unable to move due to road resistance.

According to an embodiment of the present disclosure, an apparatus for escaping an uneven driving surface for an electric vehicle includes a maximum traction identification portion configured to search for a steering angle at which maximum traction is generated by applying driving torque while rotating the steering wheel. The maximum traction identification portion is also configured to identify maximum wheel torque able to be applied after rotating the steering wheel by the steering angle at which maximum traction is generated. The apparatus also includes an axle weight computation portion configured to repeatedly calculate an axle weight applied to front and rear wheels of a vehicle in which various pitching motions are implemented.

The apparatus also includes a driveaway controller configured to receive information from the maximum traction identification portion and the axle weight computation portion and to control escape of the vehicle.

The maximum wheel torque identified by the maximum traction identification portion may include a maximum front wheel torque, which is a maximum wheel torque at which wheel slippage does not occur on a front wheel, and includes a maximum rear wheel torque, which is a maximum wheel torque at which wheel slippage does not occur on a rear wheel.

The driveaway controller may command escape of the vehicle when an axle weight calculated in the axle weight computation portion is greater than a predetermined value while a steering wheel of the vehicle rotates to the steering angle at which maximum traction is generated.

The predetermined value may be selected from among values 1.3 to 1.8 times a vehicle weight.

The driveaway controller may command escape of the vehicle when an axle weight calculated by the axle weight computation portion is a maximum value while a steering wheel of the vehicle rotates to the steering angle at which maximum traction is generated.

The axle weight computation portion may include a pitching motion implementation portion configured to implement a pitching motion such that the vehicle moves back and forth.

The pitching motion implementation portion may implement a pitching motion by alternately and repeatedly applying forward torque and reverse torque of various levels to a front wheel motor and a rear wheel motor of the vehicle while varying an application time (or application frequency).

The pitching motion implementation portion may implement a pitching motion by applying the maximum front wheel torque to a front wheel motor of the vehicle in a forward direction and applying the maximum rear wheel torque to the rear wheel motor of the vehicle in a reverse direction.

The pitching motion implementation portion may implement a pitching motion by varying an application time (or application frequency) of the maximum front wheel torque and the maximum rear wheel torque applied to the front wheel motor and the rear wheel motor of the vehicle.

While implementing the pitching motion, braking may be applied to the front and rear wheels of the vehicle in a state in which the steering wheel of the vehicle rotates to the steering angle at which maximum traction is generated.

The driveaway controller may release braking of the front and rear wheels when commanding escape of the vehicle and may command the front and rear wheels to apply the maximum front wheel torque and the maximum rear wheel torque, respectively, in the forward direction of the vehicle.

The driveaway controller may release braking of the front and rear wheels when commanding escape of the vehicle. The driveaway controller may also command the front and rear wheels to apply maximum wheel torque at which wheel slippage does not occur, which is calculated by a maximum value of an axle weight calculated by the axle weight computation portion or a predetermined value, in the forward direction of the vehicle.

A method of escaping an uneven driving surface for an electric vehicle includes in a maximum traction identification operation, searching for a steering angle at which maximum traction is generated by applying driving torque while rotating the steering wheel. The method also includes, in the maximum traction identification operation, identifying maximum wheel torque able to be applied after rotating the steering wheel by the steering angle at which maximum traction is generated. The method also includes, in an axle weight computation operation, implementing various pitching motions and repeatedly calculating an axle weight applied to front and rear wheels of the vehicle. The method also includes, in a driveaway control operation, commanding whether to perform escape of the vehicle based on information identified or calculated in the maximum traction identification operation and an axle weight calculation operation.

Identifying the maximum wheel torque in the maximum traction identification operation may include identifying a maximum front wheel torque, which is a maximum wheel torque at which wheel slippage does not occur on the front wheel, and identifying a maximum rear wheel torque, which is a maximum wheel torque at which wheel slippage does not occur on the rear wheel.

The method may also include, in the driveaway control operation, commanding escape of the vehicle when an axle weight calculated in the axle weight computation operation is more than a predetermined value or is a maximum value while rotating a steering wheel of the vehicle by the steering angle at which maximum traction is generated.

Implementing the various pitching motion may include applying braking to the front and rear wheels of the vehicle. Implementing the various pitching motion may also include implementing a pitching motion by alternately and repeatedly applying the front wheel escaping wheel torque and the rear wheel escaping wheel torque to a front wheel motor and a rear wheel motor, respectively.

Implementing the various pitching motion may include implementing the pitching motion by varying an application time (or application frequency) of the maximum front wheel torque and the maximum rear wheel torque applied to a front wheel motor and a rear wheel motor of the vehicle.

The method may also include, in the driveaway control operation, releasing braking of the front and rear wheels when commanding escape of the vehicle. The method may also include, in the driveaway control operation, applying the maximum front wheel torque and the maximum rear wheel torque to the front and rear wheels, respectively, in the forward direction of the vehicle.

The method may also include, in the driveaway control operation, turning off a system control at a vehicle speed determined after the vehicle escapes an uneven driving surface.

The method of escaping an uneven driving surface for an electric vehicle according to an embodiment may be stored in a computer-readable storage medium in which a program for executing the method on a computer.

BRIEF DESCRIPTION OF DRAWINGS

The above and other aspects, features, and advantages of the present disclosure should be more clearly understood from the following detailed description, taken in conjunction with the accompanying drawings, in which.

DETAILED DESCRIPTION

Hereinafter, embodiments of the present disclosure are described with reference to the attached drawings.

Various embodiments are described with reference to accompanying drawings. However, this may not necessarily limit the scope of present disclosure to a specific embodiment form. Instead, modifications, equivalents, and replacements included in the disclosed concept and technical scope of the present disclosure may be employed. Throughout the present disclosure, similar reference numerals are used for similar elements.

In the embodiments, the terms "first," "second," and the like may be used to distinguish one element from the other and may not limit a sequence and/or an importance, or others, in relation to the elements. In some cases, a first element may be referred to as a second element, and similarly, a second element may be referred to as a first element without departing from the scope of right in the embodiments.

The embodiment may be implemented in various manners, and are not limited to the embodiments described herein. An expression used in the singular encompasses the expression of the plural, unless the expression has a clearly different meaning in the context. The terms, "include," "comprise," "is configured to," or the like, of the description are used to indicate the presence of features, numbers, steps, operations, elements, parts, or combination thereof. The terms do not exclude the possibilities of combination or addition of one or more features, numbers, steps, operations, elements, parts, or combination thereof.

Unless otherwise defined, all terms used herein, including technical or scientific terms, have the same meanings as those generally understood by those with ordinary knowledge in the field of art to which the present disclosure belongs. Such terms as those defined in a generally used dictionary should be interpreted as having meanings equal to the contextual meanings in the relevant field of art. Such terms should not be interpreted as having ideal or excessively formal meanings unless clearly defined as having such in the present disclosure.

In embodiments, a vehicle may refer to various vehicles moving transported objects, such as people, animals, or goods, from an origin to a destination. The vehicle is not limited to vehicles travelling on roads or tracks. When a component, device, element, or the like of the present disclosure is described as having a purpose or performing an operation, function, or the like, the component, device, element, or the like should be considered herein as being "configured to" meet that purpose or to perform that operation or function. Each of the component, device, element, and the like may separately embody or be included with a processor and a memory, such as a non-transitory computer readable media, as part of the apparatus.

Figure 1:
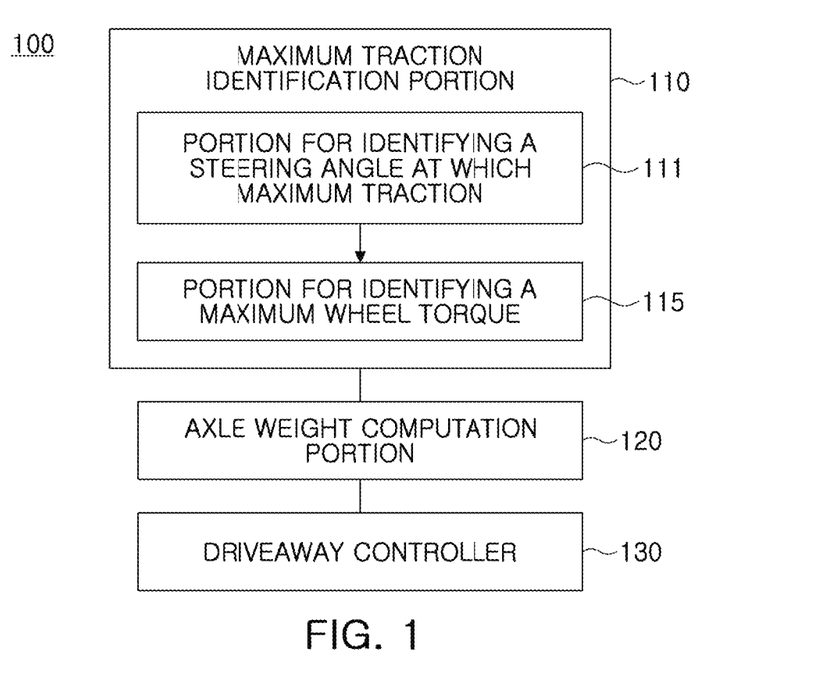
FIG. 1 is a diagram illustrating an apparatus for escaping an uneven driving surface for an electric vehicle according to an embodiment of the present disclosure.

FIG. 1 is a diagram illustrating an apparatus for escaping an uneven driving surface for an electric vehicle according to an embodiment.

Referring to FIG. 1, the apparatus 100 for escaping an uneven driving surface for an electric vehicle in an embodiment may assist in electric escape of a vehicle by identifying maximum traction state in a vehicle system without trial and error by a driver.

When a vehicle travelling off-road is stuck on an uneven driving surface and not able to move, an axle weight may be increased by attempting to escape or leave the uneven driving surface by rotating a steering wheel to secure maximum traction or by increasing a vertical force by loading the vehicle. In an embodiment, in this process, escape of the vehicle may be assisted by assuring an optimal position of the steering wheel and a maximum axle weight of the vehicle.

The apparatus 100 for escaping an uneven driving surface for an electric vehicle in an embodiment may include a maximum traction identification portion 110, an axle weight computation portion 120, and a driveaway controller 130.

Although the controller is not illustrated in the attached drawings, in the embodiment, a controller for controlling the apparatus 100 for escaping an uneven driving surface for an electric vehicle and a method S100 of escaping an uneven driving surface for an electric vehicle may be provided. Overall control may be performed by the controller. For example, the controller may be linked or connected to the apparatus 100 for escaping an uneven driving surface for an electric vehicle and may be linked or connected to the maximum traction identification portion 110, the axle weight computation portion 120, and the driveaway controller 130 and may involve in control over the components.

The maximum traction identification portion 110 may identify a maximum torque applied to a motor of an electric vehicle, which may not move by being stuck on an uneven driving surface without wheel slippage. In other words, considering that the maximum wheel torque may change based on a wheel (tire) and a change in ground contact area. An optimal position may be searched for by rotating the steering wheel of the electric vehicle. A maximum wheel torque may be applied. Also, once the optimal position (a steering angle) of the steering wheel is identified, the maximum wheel torque able to be applied while the steering wheel rotates to the corresponding steering angle may be searched for.

In other words, the maximum traction identification portion 110 may search for the steering angle at which maximum traction is generated by applying driving torque while rotating the steering wheel. The maximum traction identification portion 110 may identify the maximum wheel torque able to be applied after rotating the steering wheel by the above-mentioned steering angle at which maximum traction is generated. In other words, the maximum traction identification portion 110 may include a portion 111 for identifying a steering angle at which maximum traction is generated and a portion 115 for identifying a maximum wheel torque.

Figure 2:
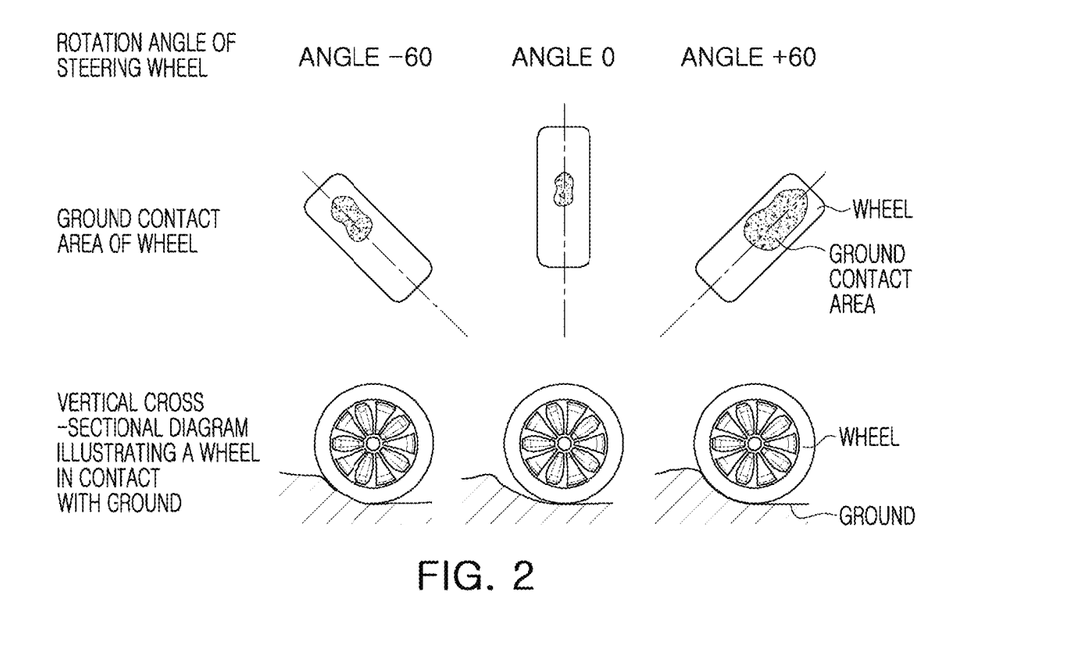
FIG. 2 is a diagram illustrating a change in a ground contact area of a wheel according to rotation of a steering wheel of an electric vehicle according to an embodiment of the present disclosure.

Referring to FIG. 2, when the electric vehicle in an embodiment is stuck on an uneven driving surface and is not able to move, a contact area C between a wheel W (tire) and ground G may be changed depending on a rotation angle of the steering wheel. When the contact area C between the wheel W (tire) and ground G is large, a friction force may be increased, such that torque, which may be applied to the wheel, may increase. Conversely, when the contact area C is small, the friction force may decrease, such that the torque, which may be applied to the wheel, may relatively decrease.

In the drawing in FIG. 2, for example, when the steering wheel rotates by +60 degrees, a maximum contact area C between the wheel W (tire) and the ground G may be assured, and the corresponding position may correspond to the steering angle at which maximum traction is generated. This is merely an example, and the steering wheel may rotate to a maximum angle in a clockwise direction and a counterclockwise direction and the steering angle at which maximum traction is generated may be identified.

Figure 3:
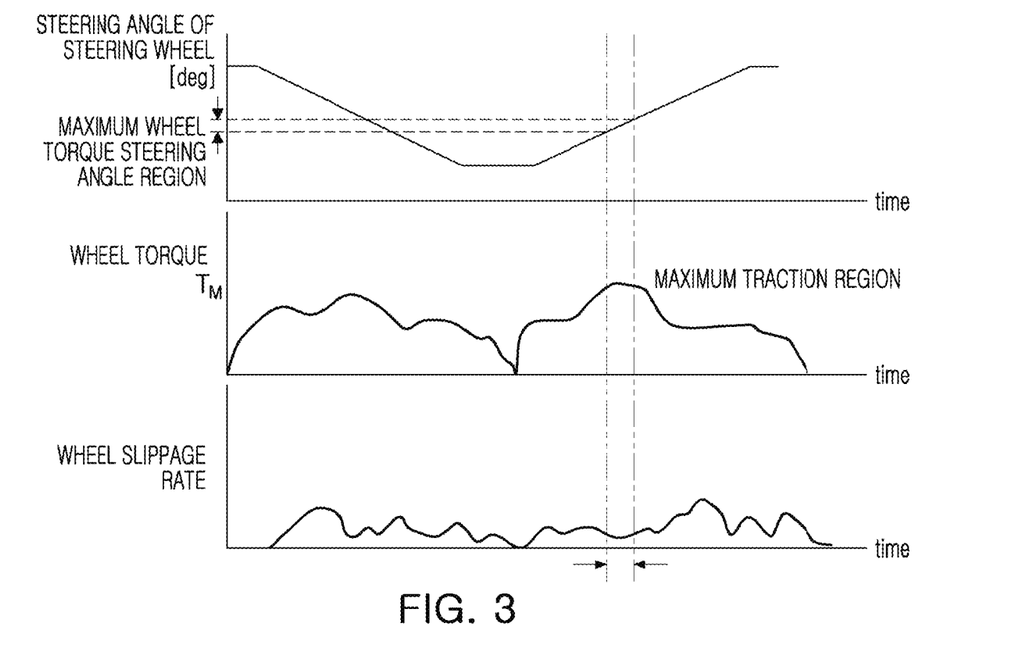
FIG. 3 is a reference diagram illustrating a state in which a maximum wheel torque changes according to a change in contact area according to rotation of a steering wheel in FIG. 2 and a steering angle of a steering wheel generating maximum traction accordingly is identified.

Referring to FIG. 3, when the electric vehicle in an embodiment is stuck on an uneven driving surface and is not able to move, the steering wheel may rotate to a maximum angle in the clockwise direction and the counterclockwise direction and the steering angle at which maximum traction is generated may be identified.

By rotating the steering wheel, torque may be applied to the front wheel (front wheel motor) connected to the steering wheel while changing the contact area between the wheel and the ground. Based on a change in the contact area, a wheel slippage rate of the front wheel may continuously change. Accordingly, the wheel torque, which may occur depending on a position (a steering angle) of the steering wheel, may continuously change. A steering angle (θ) at which the maximum wheel torque occurs may be identified. A speed and applied torque of the steering wheel may be varied (e.g., the rotation of the steering wheel may be 30 degrees/sec, and the applied torque may be 10% of the maximum value of the front wheel motor torque).

Figure 4:
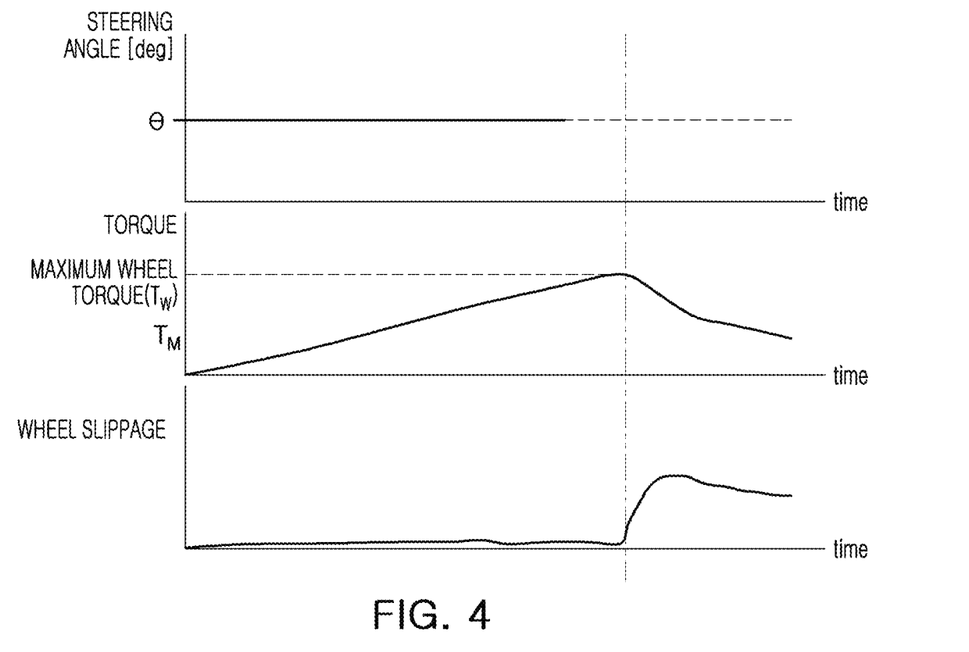
FIG. 4 is a reference diagram illustrating a process of identifying a maximum wheel torque at which wheel slippage does not occur at a steering angle at which maximum traction identified in FIG. 3 occurs.

Referring to FIG. 4, the maximum wheel torque, which may be applied without wheel slippage, may be identified by rotating the identified steering angle at which maximum traction is generated. When the steering wheel is fixed at the steering angle (θ) at which maximum traction is generated and torque is applied, and the vehicle remains stationary in a state in which wheel slippage does not occur due to friction force and reaches a critical torque, wheel slippage may increase rapidly and a torque value may decrease, and the torque value immediately before wheel slippage occurs may correspond to the maximum wheel torque.

The values of wheel torque and the wheel slippage rate described with reference to FIGS. 3 and 4 may be calculated using various sensors installed in the vehicle, such as a speed sensor, a rotation sensor, an acceleration sensor, and an angular velocity sensor, and various algorithms provided in the vehicle. The calculating method is not limited to any particular example.

The steering wheel may be fixed at the steering angle (θ) at which maximum wheel torque occurs. In this position, torque may be applied to a front wheel motor to increase linearly in the forward direction (D stage), and the maximum front wheel motor torque TMF at which wheel slippage does not occur may be identified. Because wheel slippage does not occur, other than incidental factors, the torque applied to the wheel may actually be the same as the torque applied to the motor.

Also, the steering wheel may be fixed at the steering angle (θ) at which maximum wheel torque occurs. In this position, torque may be applied to a rear wheel motor to linearly increase in the reverse direction (R stage), and the maximum rear wheel motor torque Tmr at which wheel slippage may not occur may be identified. Because wheel slippage does not occur, other than incidental factors, the torque applied to the wheel may actually be the same as the torque applied to the motor. Also, because the rear wheel is not connected to the steering wheel, there may be virtually no difference in a level of the torque not causing wheel slippage whether the torque applied to the rear wheel is in the forward direction or the reverse direction (the levels of torque may be substantially almost the same).

The axle weight computation portion 120 may repeatedly calculate the axle weight applied to axes of the front and rear wheels of the vehicle while applying a pitching motion to the vehicle. As the axle weight increases, the maximum torque, which may be applied to the wheel, may increase.

In other words, referring to [Equation 1] below, powertrain torque ($T_M \times FGR$) may not be greater than wheel slippage torque ($\mu \times W \times R$), i.e., the maximum torque, which may be transmitted to a road, and when powertrain torque is greater than wheel slippage torque, wheel slippage may occur.

$$T_M \times FGR \leq \mu \times W \times R \qquad \text{[Equation 1]}$$

(Here, Tm is motor torque, FGR is a reduction ratio, μ is a friction coefficient, W is an axle weight, and R is a radius of wheel)

Here, the axle weight W may be proportional to a level of the maximum torque, which may be transmitted to a road (ground. Accordingly, it may be indicated that, as the axle weight increases, the driving force, which may be transmitted to the ground without wheel slippage, may increase.

Accordingly, in the embodiment, the axle weight of the front wheel axis and the rear wheel axis of the vehicle may be changed by applying a pitching motion to the vehicle. The vehicle may be escaped when the maximum axle weight at which is the sum of the axle weights of the front wheel axis and the rear wheel axis of the vehicle is formed.

Figure 5A:
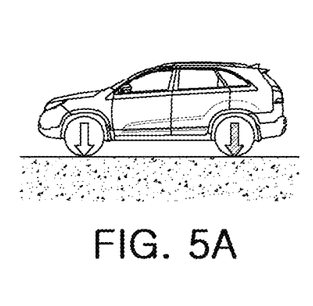
FIGS. 5A through 5D are a reference diagram illustrating implementation of pitching motion in an electric vehicle according to an embodiment of the present disclosure.
Figure 5B:
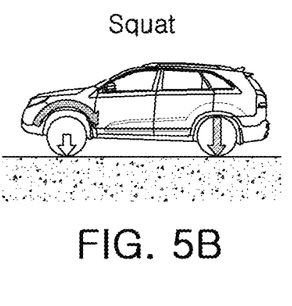
Figure 5C:
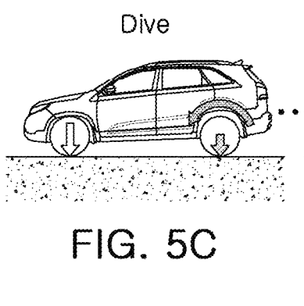
Figure 5D:
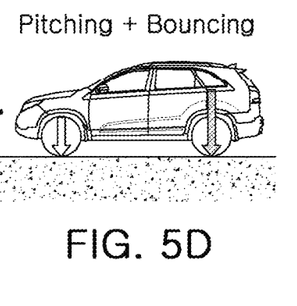

FIG. 5A illustrates the state before applying the pitching motion. And FIGS. 5B to 5D illustrate the states in which the axle weight applied to the front and rear wheels changes after the pitching motion is applied to the vehicle. The length of the arrows on the front and rear wheels corresponds to the level of the axle weight, and the more pitching motion is applied, the more the axle weight may increase. Also, as the pitching motion is applied, the vehicle may bounce back and forth.

As an example of implementing the pitching motion, 1) the steering wheel may be fixed at a steering angle (θ) at which maximum wheel torque occurs and braking may be applied to the front and rear wheels, 2) torque Tm1 may be applied to the front wheel in the forward direction in a predetermined period of time T1 such that a squat movement may be generated, 3) while reducing the torque applied to the front wheel, torque Tm2 may be applied in the reverse direction to the rear wheel in a predetermined period of time T2 such that a dive movement may be generated, and 4) the pitching motion may be implemented by repeatedly performing the operations in 2) and 3). In this process, Tm1 and Tm2 may be changed, and T1 and T2 may also be changed.

In an embodiment, Tm1 and Tm2 may correspond to the maximum front wheel torque or maximum rear wheel torque identified by the maximum traction identification portion 110. Also, T1 and T2 may be the same or different.

Figure 6:
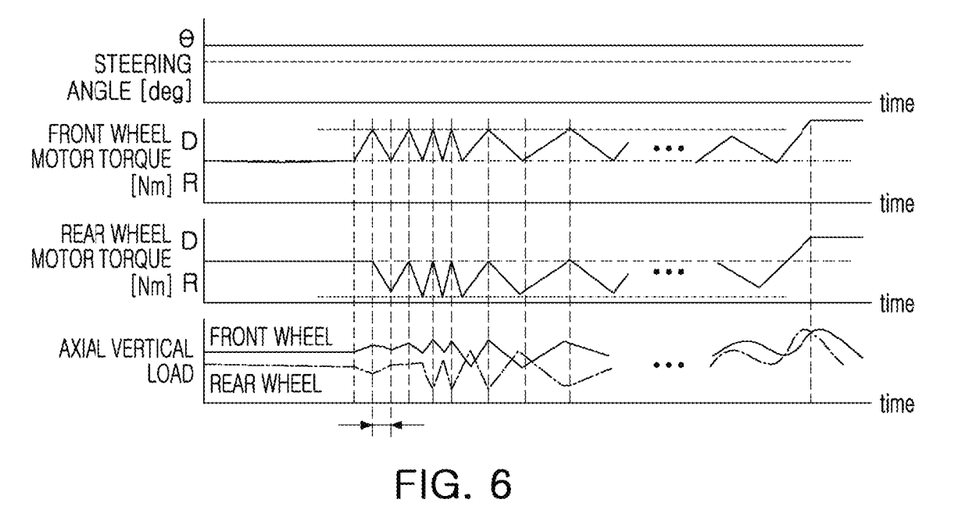
FIGS. 6 and 7 are reference diagrams illustrating identifying of a state in which an axle weight of an electric vehicle in which a pitching motion is implemented in FIG. 5D is a maximum or a target value.
Figure 7:
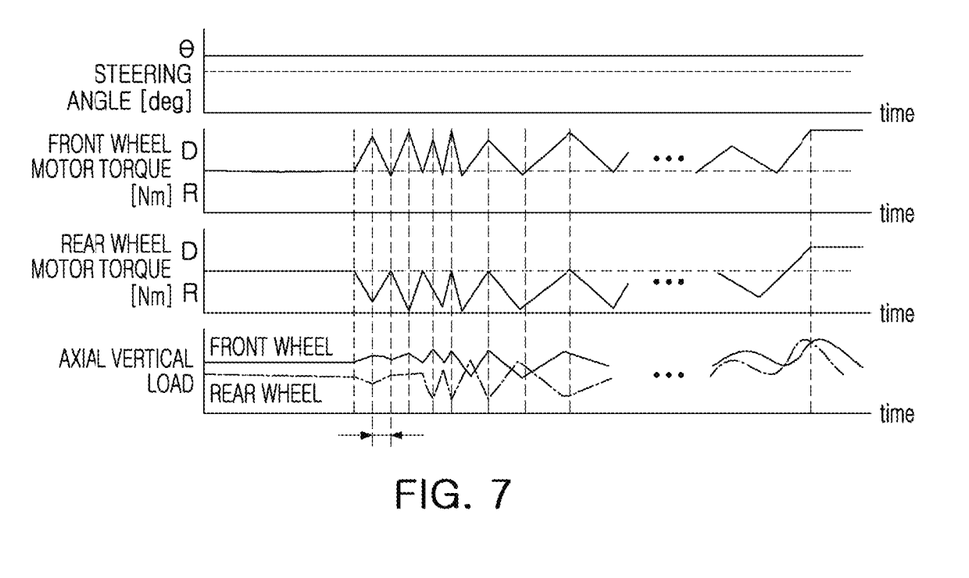

Referring to FIGS. 6 and 7, in a state in which the steering wheel is fixed at a steering angle at which maximum traction is generated and braking is applied to the front and rear wheels, changes in axle weight of the front and rear wheels occurring when wheel torque is applied alternately to the front and rear wheels may be identified. FIG. 6 illustrates an example in which the maximum front wheel torque Tmf and the maximum rear wheel torque Tmr identified by the maximum traction identification portion 110 may be applied to the front wheel and the rear wheel. FIG. 7 illustrates an example in which the torque applied to the front and rear wheels may be changed over time. In the example in FIG. 7, an embodiment thereof is not limited thereto, and torque values within a predetermined range (e.g., values 10 to 30% greater or smaller than the above vales) may be varied and applied to the front and rear wheels with reference to the maximum front wheel torque Tmf and the maximum rear wheel torque Tmr identified by the maximum traction identification portion 110.

In FIGS. 6 and 7, in either case, the axle weight applied to the front and rear wheels may become maximum or may exceed a predetermined value depending on the pitching motion, and in this case, escape of the vehicle may be performed.

$$F_{z,f} = m_b \times \frac{l_r \times g - h_{CG} \times ba_x}{l_r + l_f} \qquad \text{[Equation 2]}$$

$$F_{z,r} = m_b \times \frac{l_f \times g - h_{CG} \times ba_x}{l_r + l_f} \qquad \text{[Equation 3]}$$

$$F_z = F_{z,f} + F_{z,r} \qquad \text{[Equation 4]}$$

(In Equation 2, 3, 4, $F_z$ is a total axle weight, $F_{z,f}$ is the axle weight of the front wheel, $F_{z,r}$ is the axle weight of the rear wheel, $m_b$ is the weight of the vehicle, $l_r$ is the distance from a center of gravity to the rear axle, if is a distance from a center of gravity to the front axle, g is acceleration of gravity, $h_{CG}$ is a height of center of gravity, and $ba_x$ is vehicle acceleration in a longitudinal direction)

Figure 8:
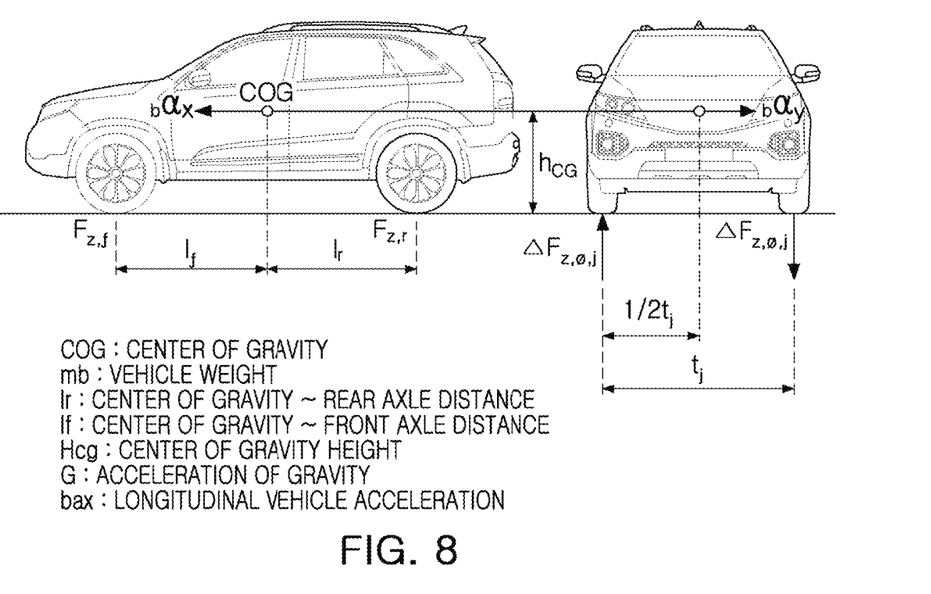
FIG. 8 is a reference diagram illustrating a method for calculating an axle weight of an electric vehicle according to an embodiment of the present disclosure.

In FIG. 8, center of gravity (COG) may be a center of gravity, and bay may be vehicle acceleration in a lateral direction.

Referring to FIG. 8 and using Equations 2, 3, and 4 above, the total axle weight of the vehicle varying based on the pitching motion may be repeatedly calculated. Also, the calculated total axle weight of the vehicle may be transmitted to the driveaway controller 130. There may be a state in which the axle weight applied to the front and rear wheels, i.e., the total axle weight ($F_z$), becomes maximum or is greater than a predetermined value (e.g., a value selected from among values 1.3 to 1.8 times the vehicle weight, desirably a value 1.5 times the vehicle weight). In this state, the driveaway controller 130, which receives the information, may command escape of the vehicle.

The axle weight computation portion 120 may include a pitching motion implementation portion implementing the pitching motion such that the vehicle may move back and forth. Also, the pitching motion implementation portion may implement the pitching motion by alternately and repeatedly applying forward torque and reverse torque of various levels to the front wheel motor and the rear wheel motor of the vehicle while varying the application time (or application frequency). Also, the pitching motion implementation portion may implement the pitching motion by alternatively applying the maximum front wheel torque to the front wheel motor of the vehicle in the forward direction and applying the maximum rear wheel torque to the rear wheel motor of the vehicle in the reverse direction. Also, the pitching motion implementation portion may implement the pitching motion by varying the application time (or application frequency) of the maximum front wheel torque and the maximum rear wheel torque applied to the front wheel motor and the rear wheel motor of the vehicle. Also, the pitching motion implementation portion may implement the pitching motion while the steering wheel of the vehicle is rotated by the steering angle at which maximum traction is generated and the braking is applied to the front and rear wheels of the vehicle in the process of implementing the pitching motion.

The driveaway controller 130 may receive information from the maximum traction identification portion 110 and the axle weight computation portion 130 and may control escape of the vehicle based on the received information. That is, the driveaway controller 130 may command the vehicle to escape on the basis of the optimal front wheel torque and optimal rear wheel torque identified in the pitching motion while the steering wheel rotates to the optimal steering angle.

In an embodiment, when the axle weight calculated by the axle weight computation portion is a maximum value while the steering wheel of the vehicle rotates to the steering angle at which maximum traction is generated, the driveaway controller 130 may command escape of the vehicle. As the pitching motion is applied to the vehicle, the total axle weight, which is the sum of the axle weights of the front and rear wheels, may increase or decrease, and escape of the vehicle may be commanded at the moment when the largest axle weight value is calculated.

Also, in another embodiment, when the axle weight calculated in the axle weight computation portion is greater than a predetermined value while the steering wheel of the vehicle rotates to the steering angle at which maximum traction is generated, the driveaway controller 130 may command escape of the vehicle. Here, the predetermined value may be determined in advance and may be a value selected from among values 1.3 to 1.8 times the vehicle weight, desirably a value 1.5 times the vehicle weight.

When the driveaway controller 130 commands escape of the vehicle, torque in the forward direction may be applied to both the front and rear wheels.

In this case, in an embodiment, when escape of the vehicle is commanded, braking of the front and rear wheels may be released, and the maximum front wheel torque and the maximum rear wheel torque identified by the maximum traction identification portion 110 may be applied to the front and rear wheels in the forward direction of the vehicle.

Also, in another embodiment, when commanding escape of the vehicle, the braking of the front and rear wheels is released, and the torque value calculated by the maximum value Wmax of the axle weight calculated by the axle weight computation portion 120 or the predetermined value (W_1.5) may be applied to the front and rear wheels. Here, specifically, the maximum value Wmax of the axle weight may include the front wheel axle weight ($W_{max,f}$) and the rear wheel axle weight ($W_{max,r}$) when the axle weight is maximum. Specifically, the predetermined value (W_1.5) may include the front wheel axle weight ($W_{1.5,f}$) and the rear wheel axle weight ($W_{1.5,r}$) when the axle weight is a predetermined value.

In other words, the maximum wheel torque not causing wheel slippage, which is calculated by the maximum value of the axle weight calculated by the axle weight computation portion 120 or a predetermined value, may be applied in the forward direction of the vehicle.

In other words, referring to [Equation 1], [Equation 2], and [Equation 3], the maximum value of powertrain torque may be proportional to the axle weight of the vehicle. Accordingly, the maximum value of powertrain torque may be calculated by [Equation 5] below using the maximum value of axle weight ($W_{max,f}$ and $W_{max,r}$) or may be calculated by [Equation 6] using predetermined values ($W_{1.5,f}$ and $W_{1.5,r}$)

$$T_{m,f} \times FGR = \mu \times W_{max,f} \times R \qquad \text{[Equation 5]}$$
$$T_{m,r} \times FGR = \mu \times W_{max,r} \times R$$

$$T_{m,f} \times FGR = \mu \times W_{1.5,f} \times R \qquad \text{[Equation 6]}$$
$$T_{m,r} \times FGR = \mu \times W_{1.5,r} \times R$$

The driveaway controller 130 may command to turn off a system control at a determined speed of the vehicle after the vehicle escapes the uneven driving surface. In other words, after the vehicle is escaping an uneven driving surface, the driveaway controller 130 may control operation of the apparatus for escaping an uneven driving surface for an electric vehicle to turn off, for example, at 3 kph.

In the description below, a method of escaping an uneven driving surface for an electric vehicle (S100) is described. The method may be implemented using at least a portion of the apparatus 100 for escaping an uneven driving surface for an electric vehicle described above.

Figure 9:
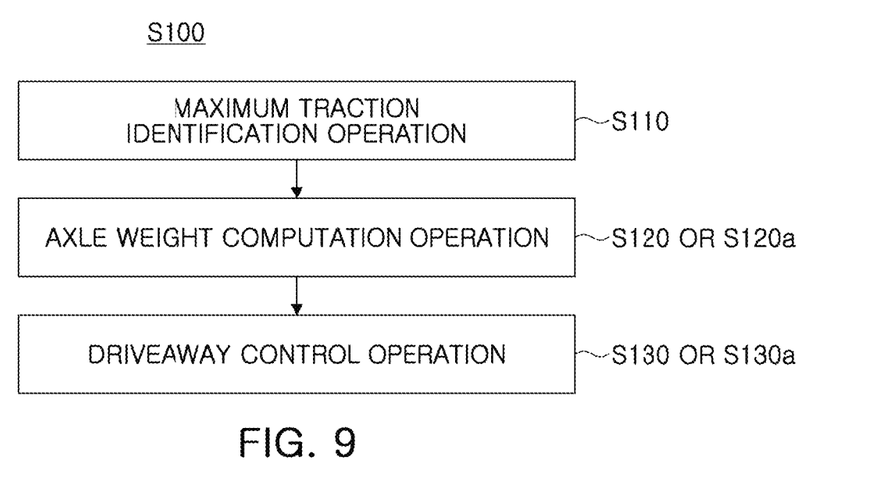
FIG. 9 is a diagram illustrating a method of escaping an uneven driving surface for an electric vehicle according to an embodiment of the present disclosure.

FIG. 9 is a diagram illustrating a method of escaping an uneven driving surface for an electric vehicle according to an embodiment, and FIGS. 10-14 are diagrams illustrating a method of escaping an uneven driving surface for an electric vehicle according to an embodiment.

Referring to FIG. 9, the method of escaping an uneven driving surface for an electric vehicle (S100) in an embodiment may be an escape method performed in the apparatus, which may assist electric escape of the vehicle by identifying maximum traction state in the vehicle system without driver trials and errors.

The method (S100) of escaping an uneven driving surface for an electric vehicle in an embodiment may include maximum traction identification operation (S110), an axle weight computation operation (S120 or S120a), and a driveaway control operation (S130 or S130a).

The controller is not illustrated in the attached drawings, but in the embodiment, a controller for controlling the apparatus 100 for escaping an uneven driving surface for an electric vehicle and the method of escaping an uneven driving surface for an electric vehicle (S100) may be provided, and overall control may be performed by the controller. For example, the controller may be involved in controlling the method of escaping an uneven driving surface for an electric vehicle (S100), specifically control over the traction identification operation (S110), the axle weight computation operation (S120 or S120a), and/or the driveaway control operation (S130 or S130a). The controller may be interlocked with the maximum traction identification portion 110, the axle weight computation portion 120, and the driveaway controller 130 related to these controls and may be involved in controlling the components.

In the maximum traction identification operation (S110), the maximum torque which may be applied to a motor of an electric vehicle stuck on an uneven driving surface and not able to move without causing wheel slippage may be identified. In other words, considering that the maximum wheel torque may change depending on a wheel (tire) and a change in ground contact area, the optimal position may be searched for by rotating the steering wheel of the electric vehicle and maximum wheel torque may be applied. Also, once the optimal position (steering angle) of the steering wheel is identified, the maximum wheel torque, which may be applied while the steering wheel rotates to the corresponding steering angle, may be searched for.

In other words, the maximum traction identification operation (S110) may include applying driving torque while rotating the steering wheel to search for the steering angle at which maximum traction is generated. The maximum traction identification operation (S110) may also include identifying the maximum wheel torque, which may be applied after rotating the steering wheel, by the steering angle at which maximum traction is generated.

Figure 10:
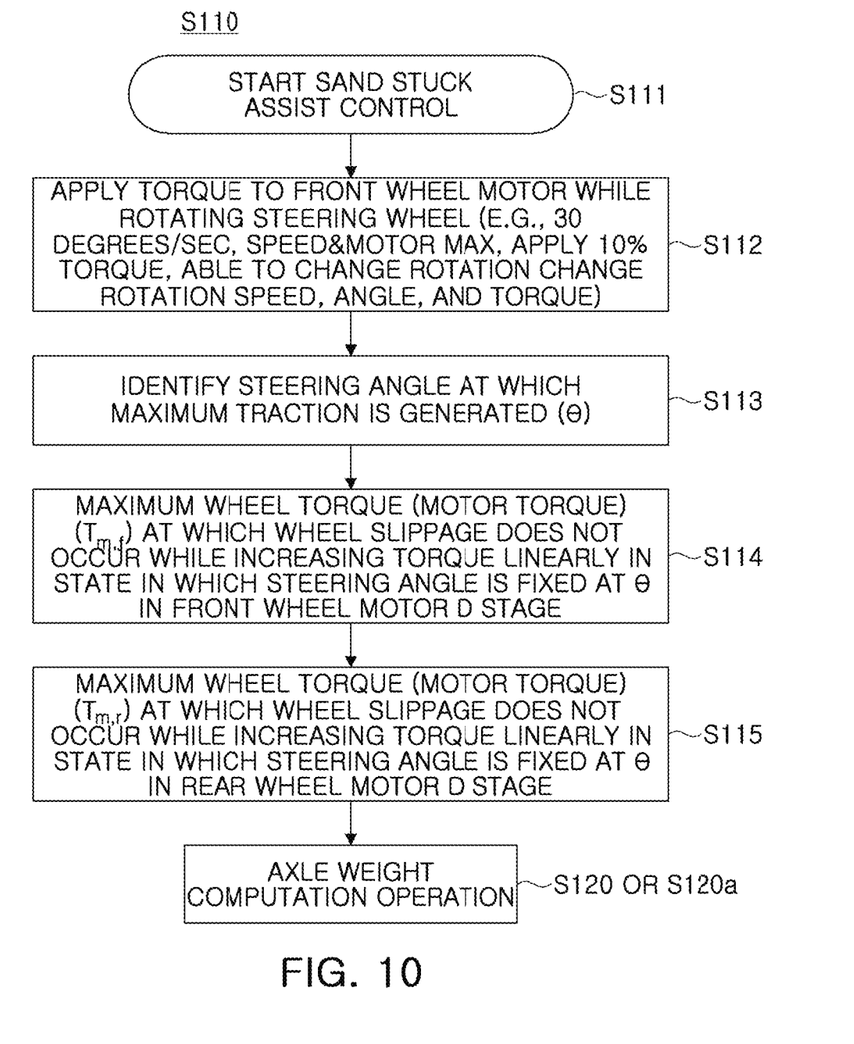
FIGS. 10-14 are diagrams illustrating a method of escaping an uneven driving surface for an electric vehicle according to an embodiment of the present disclosure.

Referring to FIG. 10, when the electric vehicle is stuck on an uneven driving surface and not able to move, the method of escaping an uneven driving surface for an electric vehicle (S100) in the embodiment may be performed. The method of escaping an uneven driving surface for an electric vehicle (S100) may be performed by the above-described apparatus 100 for escaping an uneven driving surface for an electric vehicle, and each individual operation may be performed by the maximum traction identification portion 110, the axle weight computation portion 120 and the driveaway controller 130.

The maximum traction identification operation (S110) in an embodiment may be divided into an operation of identifying the steering angle (θ) at which maximum wheel torque occurs and an operation of identifying the maximum wheel torque, which may be applied at the steering angle (θ) without wheel slippage. The maximum traction identification operation (S110) may be performed by the maximum traction identification portion 110 (S111). First, in the former case, when the electric vehicle is stuck on an uneven driving surface and is not able to move, the steering wheel may rotate in the clockwise direction and the counterclockwise direction to the maximum angle and the steering angle at which maximum traction is generated may be identified (S112 and S113).

By rotating the steering wheel, torque may be applied to the front wheel (front wheel motor) connected to the steering wheel while changing a contact area between the wheel and ground. Based on a change in contact area, a wheel slippage rate of the front wheel may continuously change. Accordingly, the wheel torque, which may occur based on a position (steering angle) of the steering wheel, may continuously change. Among the level of torques, the steering angle (θ) at which the maximum wheel torque occurs may be identified (S114). The speed and applied torque of the steering wheel may be varied (e.g., rotation of the steering wheel is 30 degrees/sec, and the applied torque is 10% of the maximum value of the front wheel motor torque).

In the description below, in the latter case, the maximum wheel torque, which may be applied without wheel slippage, may be identified by rotating the steering wheel at the identified steering angle at which maximum traction is generated. When the steering wheel is fixed at the steering angle at which maximum traction is generated (θ) and torque is applied, the vehicle may remain stationary in a state in which wheel slippage does not occur due to friction force. When the critical torque is reached, wheel slippage may rapidly increase and a torque value may decrease, and the torque value immediately before wheel slippage occurs may correspond to the maximum wheel torque. In this case, the maximum wheel torque of the front and rear wheels may be identified individually.

The steering wheel may be fixed at the steering angle (θ) at which maximum wheel torque occurs. In this position, torque may be applied to the front wheel motor to increase linearly in the forward direction (D stage) and the maximum front wheel motor torque Tmf not causing wheel slippage may be identified. Since wheel slippage does not occur, other than incidental factors, the torque applied to the wheel may actually be the same as the torque applied to the motor.

Also, the steering wheel may be fixed at the steering angle (θ) at which maximum wheel torque occurs. In this position, torque may be applied to the rear wheel motor to increase linearly in the reverse direction (R stage), and the maximum rear wheel motor torque Tmr not causing wheel slippage may be identified (S115). Because wheel slippage does not occur, other than incidental factors, the torque applied to the wheel may actually be the same as the torque applied to the motor. Also, because the rear wheel is not connected to the steering wheel, there may be no difference in the level of the torque causing wheel slippage whether the torque applied to the rear wheel is in the forward direction or the reverse direction (in practice, the levels of torque may be substantially almost the same).

The axle weight computation operation (S120) may include repeatedly calculating the axle weight applied to the front and rear wheels of the vehicle while applying a pitching motion to the vehicle. As the axle weight increases, the maximum torque which may be applied to the wheel may increase (see [Equation 1] and related descriptions). The axle weight computation operation (S120) may be performed by the axle weight computation portion 120.

Accordingly, in the embodiment, the axle weight of the front wheel axis and rear wheel axis of the vehicle may be changed by applying the pitching motion to the vehicle. When the maximum axle weight, which is the sum of the axle weights of the front wheel axis and the rear wheel axis of the vehicle, is formed, the vehicle may be escaped.

Figure 11:
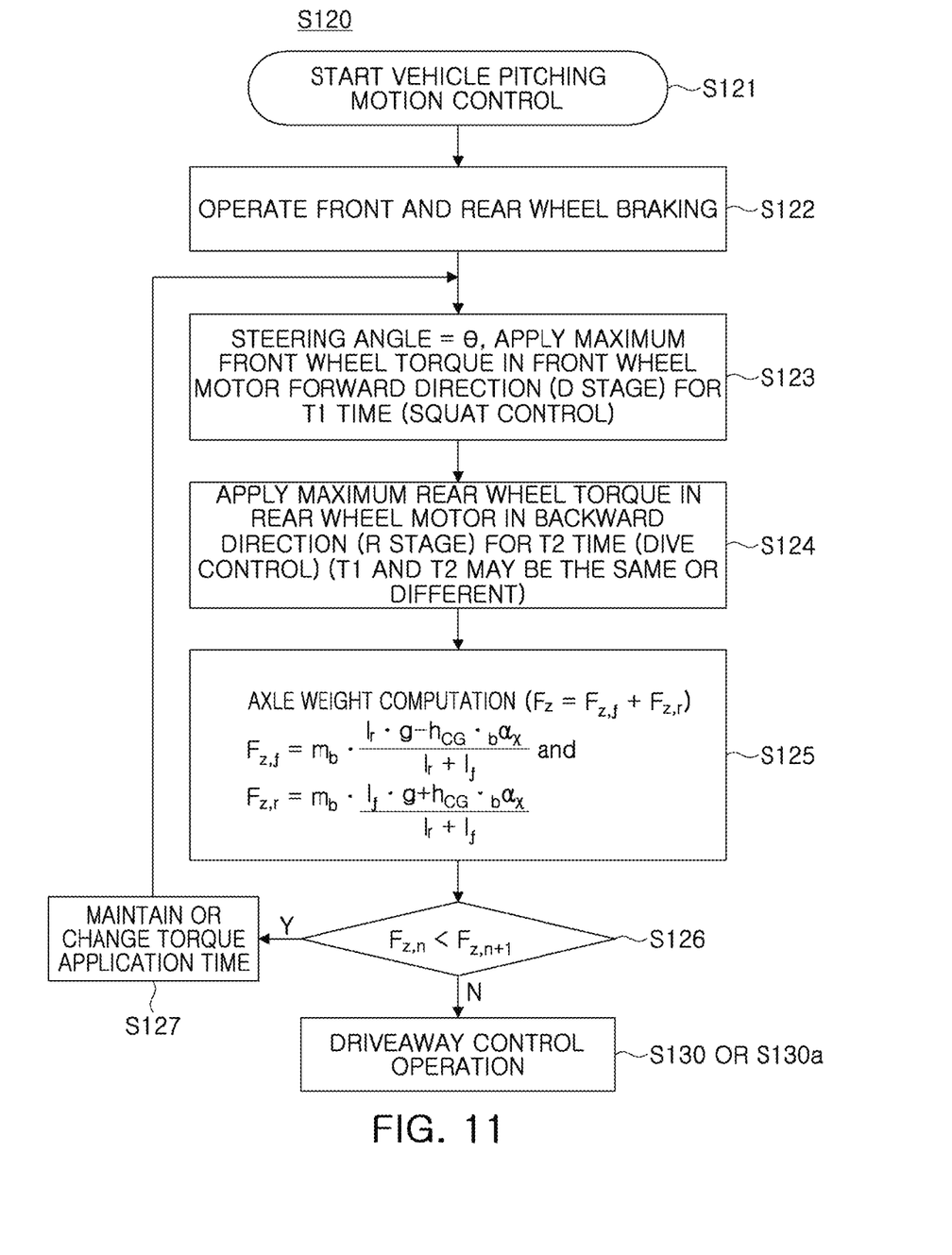

Referring to FIG. 11, as an example of implementing the pitching motion, 1) the steering wheel may be fixed at the steering angle (θ) at which maximum wheel torque occurs and braking is applied to the front and rear wheels, 2) a squat movement may be generated by applying the maximum front wheel torque identified in the maximum traction identification operation (S110) to the front wheel in the forward direction in a predetermined period of time T1, 3) a dive movement may be generated by applying the maximum rear wheel torque identified in the maximum traction identification operation (S110) to the rear wheel in the reverse direction in a predetermined period of time T2 while reducing the torque applied to the front wheel, and 4) the pitching motion may be implemented by repeatedly performing the operations 2) and 3) above, and in this process, T1 and T2 may also be changed, and T1 and T2 may be the same or different.

Also, in the driveaway control operation (S130 or S130a) to be described later, to command escape of the vehicle when the axle weight applied to the front and rear wheels, that is, the total axle weight ($F_z$), the maximum value of the total axle weight ($F_z$) may be identified.

In the embodiment, as the pitching motion continues, the pitching and bouncing applied to the vehicle may increase, and after passing the peak, the pitching and bouncing may no longer increase and a bending point may occur, and accordingly, the moment when the total axle weight ($F_z$) no longer increases may be assumed to be the maximum value of the total axle weight ($F_z$) and the process of identifying the value may be performed in the S126 operation. Accordingly, the subsequent operation, the driveaway control operation (S130 or S130a), may be performed when the total axle weight ($F_z$) continuously and repeatedly calculated in the S126 operation may be no longer greater than the previously calculated one.

Figure 12:
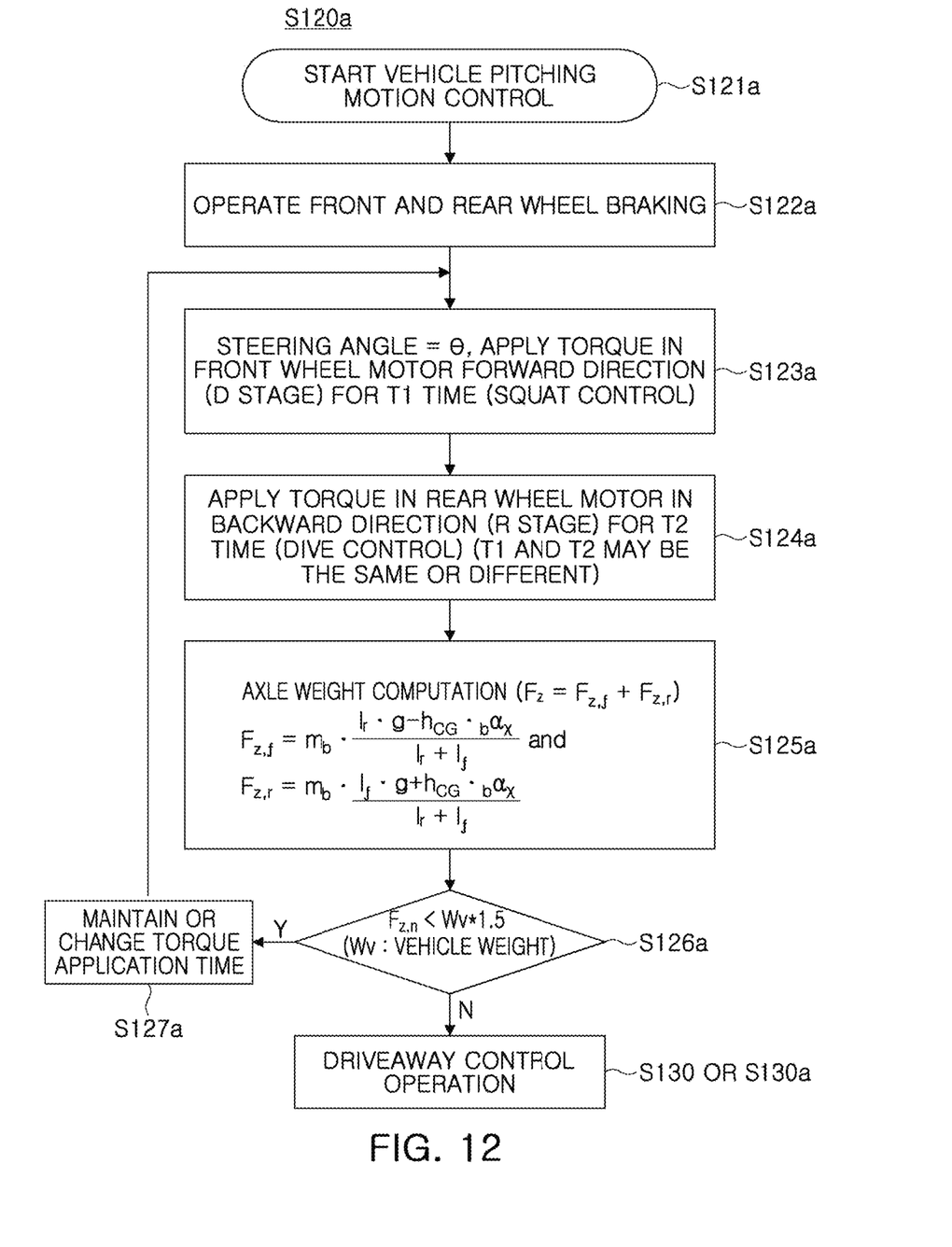

Referring to FIG. 12, as an example of implementing pitching motion, 1) the steering wheel may be fixed at the steering angle (θ) at which maximum wheel torque occurs and braking may be applied to the front and rear wheels, 2) a squat movement may be generated by applying torque Tm1 to the front wheel in the forward direction in a predetermined period of time T1, 3) a dive movement may be generated by applying torque Tm2 to the rear wheel in a predetermined period of time T2 in the reverse direction while reducing the torque applied to the front wheel, and 4) a pitching motion may be implemented by repeatedly performing the operations 2) and 3) above. In this process, Tm1 and Tm2 may be maintained or changed, and T1 and T2 may also be maintained or changed. Also, in an embodiment, Tm1 and Tm2 may correspond to the maximum front wheel torque or maximum rear wheel torque identified in the maximum traction identification operation (S110). Also, T1 and T2 may be the same or different.

In the driveaway control operation (S130 or S130a) to be described later, it may be identified whether the total axle weight ($F_z$) value is greater than a predetermined value so as to command escape of the vehicle when the axle weight applied to the front and rear wheels exceeds a predetermined value (e.g., a value selected from among values 1.3 to 1.8 times the vehicle weight, desirably a value 1.5 times the vehicle weight).

In another embodiment, as the pitching motion continues, considering that pitching and bouncing applied to the vehicle may increase and decrease or may increase again, that is, the total axle weight ($F_z$) may continuously vary, whether the total axle weight ($F_z$) value is greater than the predetermined value may be identified, and this may be identified in operation S126a. Accordingly, it may be controlled to perform the subsequent operation, the driveaway control operation (S130 or S130a) when the total axle weight ($F_z$), which is continuously and repeatedly calculated in operation S126a, exceeds the predetermined value.

Referring to FIGS. 11 and 12, when the steering wheel is fixed at a steering angle at which the maximum traction is generated and braking is applied to the front and rear wheels, changes in axle weight of the front and rear wheels may be identified, which may occur when wheel torque is applied alternately to the front and rear wheels.

FIG. 11 illustrates an example in which a predetermined amount of wheel torque is applied to the front and rear wheels, i.e., the maximum front wheel torque Tmf and the maximum rear wheel torque Tmr identified in the maximum traction identification operation (S110) to the front wheels and rear wheels. FIG. 12 illustrates an example in which the torque applied to the front and rear wheels is maintained or changed over time. In the example in FIG. 12, although an embodiment thereof is not limited thereto, and the torque or torque value within a predetermined range (e.g., 10 to 30% larger or smaller than the above values) may be applied to the front and rear wheels while maintaining or changing the value by referring to the maximum front wheel torque Tmf and the maximum rear wheel torque Tmr identified in the maximum traction identification operation (S110).

In FIGS. 11 and 12, in either method, the axle weight applied to the front and rear wheels may become maximum or may exceed a predetermined value depending on the pitching motion, and in this case, escape of the vehicle may be performed.

Referring to FIG. 8 and using Equations 2, 3, and 4 described above, the total axle weight of the vehicle varying based on the pitching motion may be repeatedly calculated. Also, the calculated total axle weight of the vehicle may be used in the driveaway control operation (S130 or S130a).

The axle weight computation operation (S120) may include pitching motion implementation in which the pitching motion may be implemented such that the vehicle may move back and forth (S121, S121a). Also, the pitching motion may be implemented by alternately and repeatedly applying forward torque and backward torque of various levels to the front wheel motor and the rear wheel motor of the vehicle while varying the application time (or application frequency). Also, the pitching motion may be implemented by alternately applying the maximum front wheel torque to the front wheel motor of the vehicle in the forward direction and applying the maximum rear wheel torque to the rear wheel motor of the vehicle in the reverse direction. Also, the pitching motion may be implemented by varying the application time (or application frequency) of the maximum front wheel torque and the maximum rear wheel torque applied to the front wheel motor and the rear wheel motor of the vehicle (S124, S125, S126, S127, S125 and S126 are operated by the Equations 2, 3 and 4 and also calculating the maximum front wheel torque and the maximum rear wheel torque by iteration) (S124a, S125a, S126a, S127a, S125a and S126a are operated by the Equations 2, 3 and 4 and also calculating the maximum front wheel torque and the maximum rear wheel torque based on the vehicle weight*1.5). Also, the pitching motion may be implemented while the steering wheel of the vehicle is rotated by the steering angle at which maximum traction is generated (S123, S123a) and braking is applied to the front and rear wheels of the vehicle (S122, S122a).

Figure 13:
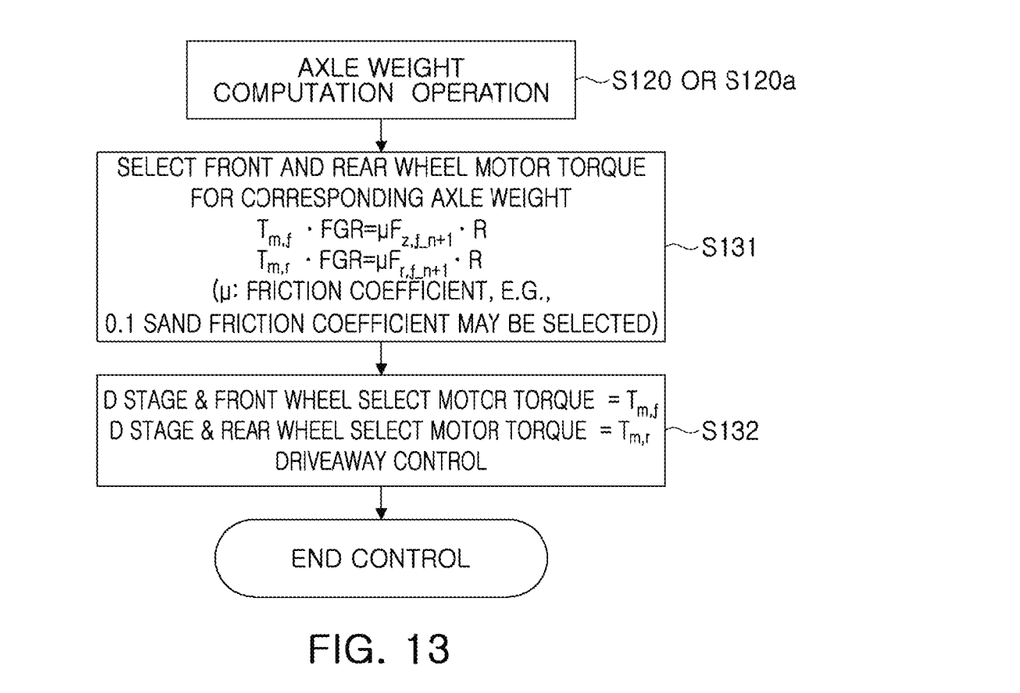
Figure 14:
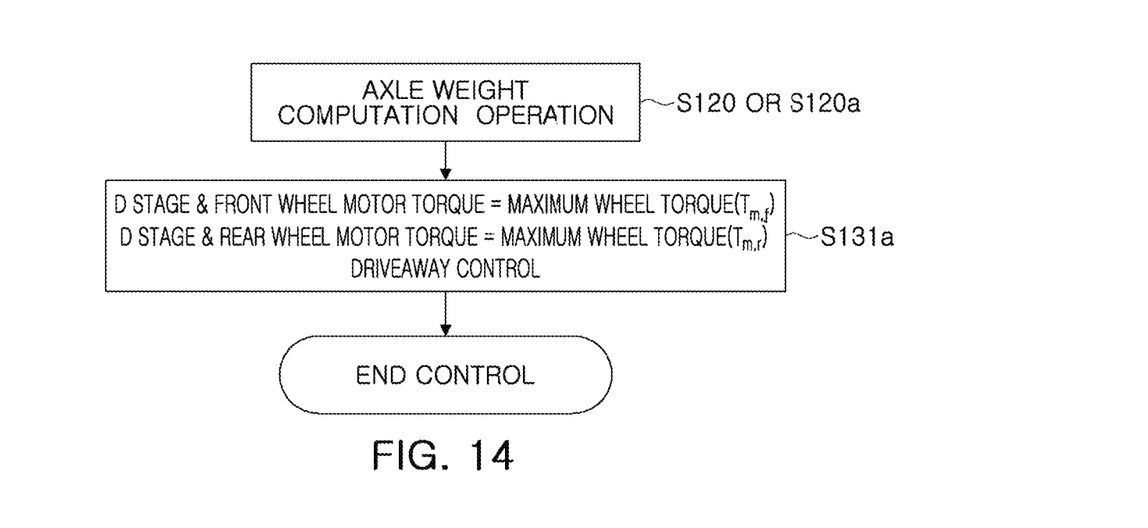

The driveaway control operation (S130 or S130a) may control escape of the vehicle based on the information identified in the maximum traction identification operation (S110) and the axle weight computation operation (S120 or S120a). In other words, the driveaway control operation (S130 or S130a) may command the vehicle to escape by the optimal front wheel and the optimal rear wheel torque identified in the pitching motion while the steering wheel rotates to the optimal steering angle. The driveaway control operation (S130 or S130a) may be performed by the driveaway controller 130.

Referring to FIGS. 13 and 14, the driveaway control operation (S130 or S130a) in an embodiment may command escape of the vehicle when the axle weight applied to the front and rear wheels, i.e., the total axle weight ($F_z$), becomes maximum or is greater than a predetermined value (e.g., a value selected from among values 1.3 to 1.8 times the vehicle weight, desirably a value 1.5 times the vehicle weight) (S131 and s131a). Also, when escape of the vehicle is commanded in the driveaway control operation (S132 or S131a), braking of the front and rear wheels may be released and torque in the forward direction may be applied to both the front and rear wheels.

However, in this case, the driveaway control operation (S130) illustrated in FIG. 13 is merely an embodiment. When commanding escape of the vehicle, the braking of the front and rear wheels may be released, and the torque value calculated by the maximum value Wmax of the axle weight calculated by the axle weight computation portion 120 or the predetermined value (W_1.5) may be applied to the front and rear wheels (see Equations 5 and 6).

Also, the driveaway control operation (S130a) illustrated in FIG. 14 may be another embodiment. When commanding escape of the vehicle, braking of the front and rear wheels may be released, and the maximum front wheel torque and the maximum rear wheel torque identified in the maximum traction identification operation (S110) may be applied to the front and rear wheels in the forward direction of the vehicle.

The driveaway control operation (S130) may be controlled to turn off the system control at a determined speed of the vehicle after the vehicle escapes the uneven driving surface. In other words, after the vehicle is escaping an uneven driving surface, an operation of the apparatus for escaping an uneven driving surface for an electric vehicle may be controlled to turn off, for example, at 3 kph.

The methods according to embodiments may be implemented in the form of program instructions, which may be executed through various computer means and written on a computer-readable medium. A computer-readable medium may include program instructions, data files, data structures, and the like alone or in combination. Program instructions written on a computer-readable medium may be specially designed and configured for the embodiments or may be known and usable by those having ordinary skill in the art.

Examples of a computer-readable medium may include hardware devices especially configured to store and execute program instructions, such as ROM, RAM, flash memory, or the like. Examples of program instructions may include machine language code created by a compiler, as well as high-level language code, which may be executed by a computer using an interpreter, or the like. The above-described hardware device may be configured to operate with at least one software module to perform operations described in the embodiments, and vice versa.

The device 100 for calculating a weight of a vehicle in the embodiment may include a storage portion 140. The storage portion 140 may be a recording medium suitable for the storing device 100 for calculating a weight of a vehicle, for example, magnetic media such as hard disk, floppy disk and magnetic tape, optical media such as compact disk read only memory (CD-ROM) and digital video disk (DVD), magneto-optical media, such as a floptical disk, or a semiconductor memory such as a flash memory, erasable programmable ROM (EPROM), or SSD manufactured based on the memories.

The embodiments may be implemented by a non-volatile memory (not illustrated) configured to store data relating to algorithms configured to control operations of various components of the vehicle or software instructions reproducing the algorithms. The embodiments may be implemented by a processor (not illustrated) configured to perform operations described above or below using data stored in the corresponding memory. Here, a memory and a processor may be implemented as individual chips. Alternatively, a memory and a processor may be implemented as a single chip integrated with each other. A processor may have the form of one or more processors.

The components of device 100 for calculating a weight of a vehicle may be connected in a wired manner or wirelessly and may exchange information using a network provided in the vehicle. The method of calculating a weight of a vehicle (S100) may also exchange information in a wired manner or wirelessly using a network provided in the vehicle. For example, data may be exchanged using network communication means provided in a vehicle, such as Ethernet, media oriented systems transport (MOST), Flexray, controller area network (CAN), local interconnect network (LIN), Internet, LTE, 5G, Wi-Fi, Bluetooth, near field communication (NFC), Zigbee, radio frequency (RF), and the like.

According to the aforementioned embodiments, when wheels of an electric vehicle traveling off-road are unable to move due to road resistance, the device and the method may easily perform escaping in the circumstances.

Also, the device and the method may easily perform escape of the vehicle without trials and errors of the driver by implementing an escape system in the system of the vehicle to obtain maximum traction.

While the embodiments have been illustrated and described above, it should be apparent to those having ordinary skill in the art that modifications and variations could be manufactured without departing from the scope of the present disclosure as defined by the appended claims.

What is claimed is:

1. An apparatus for escaping an uneven driving surface for an electric vehicle, the apparatus comprising:
   a maximum traction identification portion configured to:
      search for a steering angle at which maximum traction is generated by applying driving torque while rotating a steering wheel; and
      identify maximum wheel torque able to be applied after rotating the steering wheel by the steering angle at which maximum traction is generated;
   an axle weight computation portion configured to repeatedly calculate an axle weight applied to front and rear wheels of a vehicle in which various pitching motions are implemented; and
   a driveaway controller configured to receive information from the maximum traction identification portion and the axle weight computation portion and to control escape of the vehicle.

2. The apparatus of claim 1, wherein the maximum wheel torque identified by the maximum traction identification portion includes:
   a maximum front wheel torque, which is a maximum wheel torque at which wheel slippage does not occur on a front wheel, and
   a maximum rear wheel torque, which is a maximum wheel torque at which wheel slippage does not occur on a rear wheel.

3. The apparatus of claim 1, wherein the driveaway controller is further configured to command escape of the vehicle when an axle weight calculated by the axle weight computation portion is greater than a predetermined value while a steering wheel of the vehicle rotates to the steering angle at which maximum traction is generated.

4. The apparatus of claim 1, wherein a predetermined value is selected from among values 1.3 to 1.8 times a vehicle weight.

5. The apparatus of claim 1, wherein the driveaway controller is further configured to command escape of the vehicle when an axle weight calculated by the axle weight computation portion is a maximum value while a steering wheel of the vehicle rotates to the steering angle at which maximum traction is generated.

6. The apparatus of claim 1, wherein the axle weight computation portion includes a pitching motion implementation portion configured to implement a pitching motion such that the vehicle moves back and forth.

7. The apparatus of claim 6, wherein the pitching motion implementation portion implements the pitching motion by alternately and repeatedly applying forward torque and reverse torque of various levels to a front wheel motor and a rear wheel motor of the vehicle while varying an application time or an application frequency.

8. The apparatus of claim 2, wherein a pitching motion implementation portion implements a pitching motion by applying the maximum front wheel torque to a front wheel motor of the vehicle in a forward direction and applying the maximum rear wheel torque to a rear wheel motor of the vehicle in a reverse direction.

9. The apparatus of claim 8, wherein the pitching motion implementation portion implements the pitching motion by varying an application time or an application frequency of the maximum front wheel torque and the maximum rear wheel torque applied to the front wheel motor and the rear wheel motor of the vehicle.

10. The apparatus of claim 6, wherein, while implementing the pitching motion, braking is applied to the front and rear wheels of the vehicle in a state in which the steering wheel of the vehicle rotates to the steering angle at which maximum traction is generated.

11. The apparatus of claim 2, wherein the driveaway controller is further configured to:
release braking of the front and rear wheels when commanding escape of the vehicle; and
command the front and rear wheels to apply the maximum front wheel torque and the maximum rear wheel torque, respectively, in a forward direction of the vehicle.

12. The apparatus of claim 2, wherein the driveaway controller is further configured to:
release braking of the front and rear wheels when commanding escape of the vehicle; and
command the front and rear wheels to apply maximum wheel torque at which wheel slippage does not occur, which is calculated by a maximum value of an axle weight calculated by the axle weight computation portion or a predetermined value, in a forward direction of the vehicle.

13. A method of escaping an uneven driving surface for an electric vehicle, the method comprising:
in a maximum traction identification operation:
searching, by a maximum traction identification portion, for a steering angle at which maximum traction is generated by applying a driving torque to at least one of a front wheel or a rear wheel of the electric vehicle while rotating a steering wheel; and
identifying, by the maximum traction identification portion, a maximum wheel torque able to be applied after rotating the steering wheel by the steering angle at which maximum traction is generated;
in an axle weight computation operation:
implementing, by an axle weight computation portion, various pitching motions and repeatedly calculating an axle weight applied to the front and rear wheels of the vehicle; and
in a driveaway control operation:
commanding, by a driveaway controller, to perform escape of the vehicle based on information identified or calculated in the maximum traction identification operation and an axle weight calculation operation.

14. The method of claim 13, wherein identifying the maximum wheel torque in the maximum traction identification operation includes:
identifying, by the maximum traction identification portion, a maximum front wheel torque, which is a maximum wheel torque at which wheel slippage does not occur on the front wheel; and
identifying, by the maximum traction identification portion, a maximum rear wheel torque, which is a maximum wheel torque at which wheel slippage does not occur on the rear wheel.

15. The method of claim 13, further comprising:
in the driveaway control operation:
commanding, by the driveaway controller, escape of the vehicle when an axle weight calculated in the axle weight computation operation is more than a predetermined value or is a maximum value while rotating a steering wheel of the vehicle by the steering angle at which maximum traction is generated.

16. The method of claim 14, wherein implementing the various pitching motions includes:
applying braking to the front and rear wheels of the vehicle; and
implementing a pitching motion by alternately and repeatedly applying the front wheel escaping wheel torque and the rear wheel escaping wheel torque to a front wheel motor and a rear wheel motor, respectively.

17. The method of claim 16, wherein implementing the various pitching motions further includes:
implementing the pitching motion by varying an application time or an application frequency of the maximum front wheel torque and the maximum rear wheel torque applied to a front wheel motor and a rear wheel motor of the vehicle.

18. The method of claim 17, further comprising:
in the driveaway control operation:
releasing braking of the front and rear wheels when commanding escape of the vehicle; and
applying the maximum front wheel torque and the maximum rear wheel torque to the front and rear wheels, respectively, in a forward direction of the vehicle.

19. The method of claim 18, further comprising:
in the driveaway control operation,
turning off a system control at a vehicle speed determined after the vehicle escapes an uneven driving surface.

20. A non-transitory computer-readable storage medium in which a program for executing a method of escaping an uneven driving surface for an electric vehicle is recorded, the program to direct a processor to perform acts of:
searching for a steering angle at which maximum traction is generated by applying a driving torque to at least one of a front wheel or a rear wheel of the electric vehicle while rotating a steering wheel;
identifying maximum wheel torque able to be applied after rotating the steering wheel by the steering angle at which maximum traction is generated;
implementing various pitching motions and repeatedly calculating an axle weight applied to the front and rear wheels of the vehicle; and
commanding to perform escape of the vehicle based on the identified maximum wheel torque or the calculated axle weight applied to the front and rear wheels.

* * * * *